Sept. 8, 1931.    A. O. APPELBERG    1,822,191
THERMOSTAT SWITCH
Filed May 21, 1930
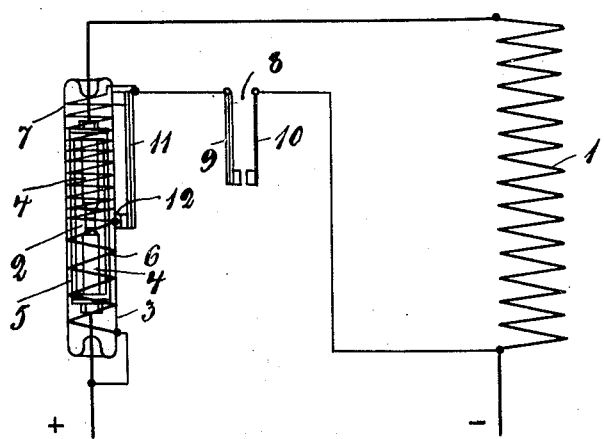
A. O. Appelberg
INVENTOR
By: Marks & Clerk
Attys.

Patented Sept. 8, 1931

1,822,191

UNITED STATES PATENT OFFICE

AXEL OSVALD APPELBERG, OF STOCKHOLM, SWEDEN, ASSIGNOR TO AKTIEBOLAGET BIRKA REGULATOR, OF STOCKHOLM, SWEDEN, A COMPANY OF SWEDEN

THERMOSTAT SWITCH

Application filed May 21, 1930, Serial No. 454,399, and in Sweden May 25, 1929.

The present invention has for its object a current regulating device for electrical apparatus, such as heating apparatus, electric flat irons, cooking apparatus, or the like. To control the apparatus circuit said regulating device is provided with a thermostat switch enclosed in a receptacle and provided with a heating winding disposed outside said receptacle. The switch circuit is in turn controlled by an auxiliary or relay switch. In electrical heating apparatus the device according to the invention may, by way of example, be applied as an over-heating protection, the relay switch preferably consisting of a thermostatic temperature adjuster disposed in thermical communication with the apparatus or the medium to be protected against over-heating. In known arrangements of this kind the heating winding of the main thermostat switch is switched-on when the temperature adjuster, upon reaching or exceeding a certain pre-determined temperature limit, is closed, and is held continuously connected into circuit up to the moment when its temperature, after the disconnection of the heating appartus, has fallen so far that the temperature adjuster is again opened. The amount of heat developed in the heating winding of the main thermostat switch must, of course, be so adjusted that it is sufficient to bring about the opening of the switch with a satisfactory rapidity. After the switch has been opened, however, only a comparatively small amount of heat is required to hold the switch in open position. In known arrangements the greater part of the amount of heat developed, after the opening of the switch represents an unnecessary current consumption and is even directly injurious for the reason that the deformation of the heat sensitive or operative part of the main switch may easily go too far. This inconvenience is eliminated by the present invention, according to which the heating winding of the main thermostat switch consists of several parts which are mutually shiftably connected by means of an auxiliary or relay thermostat switch disposed in thermic communication with the winding. By the shifting of said auxiliary switch under the influence of the heat development in the winding a reduction in the heat development is brought about.

The invention will be more closely described with reference to the accompanying drawing which shows a circuit diagram of an embodiment of the invention. The heating element 1 of the heating apparatus is normally connected into circuit over the main thermostat switch 2. Said switch is enclosed in a gas-tightly sealed receptacle 3 of glass or the like. The switch consists of two rods 4 disposed co-axially in the container. The opposing ends of said rods make normally contact with each other whereas their opposite ends, through the intermedium of a suitable electrical insulation, are attached to the ends of an enclosing frame or sleeve 5 of a material having a high coefficient of expansion. The heating winding of the main thermostat switch is wound around the receptacle 3. The heating winding consists of two mutually series connected parts, i. e. a thicker winding 6 having a comparatively small resistance and a finer winding 7 having a high electrical resistance.

The heating winding is by its one end connected to the positive pole of the supply mains and by its opposite end to the one terminal of a preferably adjustable, normally open thermostatic temperature adjuster 8 which is disposed in thermical communication with the heating apparatus and which, in a manner known per se, consists of a bi-metallic rod 9 and a counter-contact 10. The opposite terminal of the temperature adjuster is connected to the negative pole of the supply mains.

The high ohmic resistance part 7 of the heating winding of the main thermostat switch is normally short-circuited by an auxiliary thermostat switch consisting of a bi-metallic rod 11 normally bearing against a fixed contact 12. The bi-metallic rod 11 is arranged in such a manner that it is actuated by heat development both from the thicker winding part 6 and from the finer winding part 7.

The apparatus operates as follows. Upon reaching a certain pre-determined temperature limit the temperature adjuster 8 disposed in thermical communication with the heating apparatus 1 is closed, the thicker winding part 6 of the thermostat switch being then connected into circuit. The resistance in said part is so adjusted that the amount of heat then developed therein is sufficient to bring about a rapid opening of the thermostat switch on account of the expansion of its heat sensitive part 5. Through the heat development also the auxiliary thermostatic switch 11 is, however, actuated and shifted and interrupts the short-circuit of the finer winding 7, shortly after the contact of the main thermostat switch has been opened. This results in that the entire heating winding will be connected into circuit and its total resistance will then be multiplied and the heat development will be considerably reduced. The high ohmic winding 7 is then so adjusted that the amount of heat developed in the entire heating winding is only just sufficient to hold both the contacts 4, 4 of the main switch and also the switch 11, 12 in open positions. On the other hand, the amount of heat then developed cannot bring about any injurious deformation of the heat sensitive part in the main thermostat switch or the switch 11, 12 respectively. After the temperature in the heating apparatus 1 has fallen below the pre-determined temperature limit the temperature adjuster 8 is opened, whereby the heating circuit of the main thermostat switch is interrupted. The main thermostat switch together with the appertaining auxiliary thermostat switches return now to the starting positions and the heating apparatus is connected into circuit again.

The circuit arrangement affords also the advantage that unnecessary current consumption during the time of interruption is avoided.

I claim:

1. An arrangement in electric apparatus, the current supply of which is controlled by a thermostat switch enclosed in a receptacle and provided with a heating winding disposed outside said receptacle, the circuit of said winding being in turn controlled by an auxiliary or relay switch, characterized in that the heating winding of the thermostat switch consists of several parts which are mutually shiftably connected by means of an auxiliary thermostat switch disposed in thermical communication with the external winding, the shifting of the latter switch under the influence of the heat development in the winding bringing about a reduction of the heat development in said winding.

2. An arrangement as claimed in claim 1, characterized in that the heating winding consists of two mutually series-connected winding parts, i. e. a comparatively low ohmic resistance part (6) and a high ohmic resistance part (7) which latter is normally short-circuited by the auxiliary thermostatic switch (11).

3. An arrangement as claimed in claim 1, characterized in that the development of heat in the heating winding, reduced by the shifting of the auxiliary switch (11), is only just sufficient to hold the thermostat contact and said switch (11) in open positions.

In testimony whereof I affix my signature.

AXEL OSVALD APPELBERG.